(12) United States Patent
Kodati et al.

(10) Patent No.: US 11,953,184 B2
(45) Date of Patent: Apr. 9, 2024

(54) EYE-BOT READING LIGHT

(71) Applicant: GOODRICH LIGHTING SYSTEMS, INC., Phoenix, AZ (US)

(72) Inventors: Sambasiva Rao Kodati, Krishna District (IN); Arun Kumar Asoka Kumar, Kollam (IN); Praveen Kumar Busaji, Hyderabad (IN)

(73) Assignee: GOODRICH LIGHTING SYSTEMS, INC., Phoenix, AZ (US)

( * ) Notice: Subject to any disclaimer, the term of this patent is extended or adjusted under 35 U.S.C. 154(b) by 6 days.

(21) Appl. No.: 17/882,475

(22) Filed: Aug. 5, 2022

(65) Prior Publication Data
US 2023/0341117 A1    Oct. 26, 2023

(30) Foreign Application Priority Data
Apr. 20, 2022    (IN) .............................. 202241023257

(51) Int. Cl.
| | |
|---|---|
| *F21V 21/15* | (2006.01) |
| *B64D 11/00* | (2006.01) |
| *F21V 14/02* | (2006.01) |
| *F21V 21/30* | (2006.01) |
| *F21V 23/04* | (2006.01) |

(52) U.S. Cl.
CPC .............. *F21V 21/15* (2013.01); *B64D 11/00* (2013.01); *F21V 14/02* (2013.01); *F21V 21/30* (2013.01); *F21V 23/0464* (2013.01); *B64D 2011/0053* (2013.01)

(58) Field of Classification Search
CPC ...... F21V 21/15; F21V 21/30; F21V 23/0464; F21V 23/0435; F21V 23/0471; F21V 14/02; B64D 2011/0053; B60Q 3/20; B60Q 3/44; B60Q 3/76
See application file for complete search history.

(56) References Cited

U.S. PATENT DOCUMENTS

| | | | | |
|---|---|---|---|---|
| 6,079,862 | A | * | 6/2000 | Kawashima .......... G01S 3/7864 700/59 |
| 7,253,744 | B2 | | 8/2007 | Colacecchi |
| 9,045,079 | B2 | | 6/2015 | Boomgarden et al. |
| 10,272,834 | B2 | | 4/2019 | Riedel |
| 10,935,222 | B1 | * | 3/2021 | Laliberte ................. F21V 21/26 |
| 2012/0147604 | A1 | * | 6/2012 | Farmer .................. H05B 45/10 362/249.02 |

(Continued)

FOREIGN PATENT DOCUMENTS

WO    2018043812    3/2018

OTHER PUBLICATIONS

European Patent Office, European Search Report dated Sep. 8, 2023 in Application No. 23169064.5.

*Primary Examiner* — William N Harris
(74) *Attorney, Agent, or Firm* — SNELL & WILMER L.L.P.

(57) ABSTRACT

A light assembly includes a mounting bracket, a light coupled to the mounting bracket, a guide sensor coupled to the mounting bracket, a movement mechanism coupled to the mounting bracket, and a controller operably coupled to the light assembly. The controller is configured to receive data from the guide sensor and command actuation of the movement mechanism in response to the data received from the guide sensor.

18 Claims, 10 Drawing Sheets

(56) References Cited

U.S. PATENT DOCUMENTS

| | | | |
|---|---|---|---|
| 2015/0308642 A1* | 10/2015 | Vo | H04N 23/56 |
| | | | 362/648 |
| 2016/0090031 A1 | 3/2016 | Riedel | |
| 2019/0368702 A1* | 12/2019 | Sousa | F21V 21/15 |
| 2022/0032840 A1* | 2/2022 | Madhav | B60Q 3/44 |

* cited by examiner

EYE-BOT READING LIGHT

CROSS-REFERENCE TO RELATED APPLICATIONS

This application claims priority to, and the benefit of, India Patent Application No. 202241023257, filed Apr. 20, 2022, (DAS Code 3D4D) and titled "EYE-BOT READING LIGHT," which is incorporated by reference herein in its entirety for all purposes.

FIELD

The present disclosure relates generally to light assemblies and, more particularly, to automated light systems for aircraft and methods for operating light systems.

BACKGROUND

Modern aircraft typically include passenger reading lights located throughout the aircraft cabin. For example, each seat may have a dedicated reading light located in the ceiling panel over the seat. The passenger reading lights are manually operated (e.g., the passenger manually turns the light on/off, positions the light at a desired angle, and/or selects the desired brightness). Airplane reading lights are provided to illuminate a passenger's workspace while their reading, eating, etc. It is often desirable to change the direction and intensity of the reading light throughout the duration of a flight. This change is typically done manually by the passengers. Passengers travelling in luxury classes, for instance, would benefit from an automatic focus adjustment and orientation change responsive to passenger's position in the suite. However, Artificial Intelligence (AI) is not presently available in existing passenger reading lights.

SUMMARY

A light assembly is disclosed herein. In accordance with various embodiments, the light system includes a mounting bracket, a light coupled to the mounting bracket, a guide sensor coupled to the mounting bracket, a movement mechanism coupled to the mounting bracket, and a controller operably coupled to the light assembly. The controller is configured to receive data from the guide sensor and command actuation of the movement mechanism in response to the data received from the guide sensor.

In various embodiments, the movement mechanism includes a first support bracket, a second support bracket, and a third support bracket. The first support bracket has a first flange, a second flange opposite the first flange, and a third flange. The first and second flanges are configured to be coupled to the mounting bracket. The second support bracket has a first surface extending along a first plane and a second surface extending along a second plane perpendicular to the first plane. The first surface is configured to be coupled to the third flange of the first support bracket. The third support bracket has a first foot and a second foot. The first foot and the second foot both extend from a same edge of the third support bracket and along a same plane. The second surface of the second support bracket is configured to be coupled to an area between the first foot and the second foot.

In various embodiments, the movement mechanism further includes a first motor coupled to the third flange of the first support bracket and the first surface of the second support bracket, and a second motor coupled to second surface of the second support bracket and the area between the first foot and the second foot of the third support bracket.

In various embodiments, the first motor is configured to rotate the light assembly along an x-axis and the second motor is configured to rotate the light assembly along a y-axis such that the light assembly can rotate in both axis on an axis point.

In various embodiments, the guide sensor is configured to detect movement of a passenger.

In various embodiments, the data received by the controller from the guide sensor is the movement of the passenger.

In various embodiments, the light assembly further includes an ambient sensor.

In various embodiments, the ambient sensor is configured to detect at least one of an ambient light and an ambient temperature.

In various embodiments, the controller is further configured to receive data from the ambient sensor and adjust the light in response to the data received from the ambient sensor.

A method for controlling a light assembly is also disclosed herein. In accordance with various embodiments, the method may include receiving data from a guide sensor coupled to a mounting bracket, and actuating a movement mechanism coupled to the mounting bracket in response to data received from the guide sensor.

In various embodiments, the movement mechanism includes a first support bracket coupled to the mounting bracket, a second support bracket coupled to the first support bracket, and a third support bracket coupled to the second support bracket.

In various embodiments, the movement mechanism further includes a first motor coupled to the first support bracket and the second support bracket and a second motor coupled to the second support bracket and the third support bracket.

In various embodiments, the method includes rotating the light assembly along an x-axis via the first motor and rotating the light assembly along a y-axis via the second motor such that the light assembly can rotate in both axis on an axis point.

In various embodiments, the method includes detecting movement of a passenger via the guide sensor.

In various embodiments, the method includes receiving data from the guide sensor comprises data indicative of the movement of the passenger.

In various embodiments, the method includes detecting at least one of an ambient light and an ambient temperature via an ambient sensor.

In various embodiments, the method includes receiving data from the ambient sensor and adjusting a light coupled to the mounting bracket in response to the data received from the ambient sensor.

An article of manufacture including a tangible, non-transitory computer-readable storage medium having instructions stored thereon for controlling a light assembly that, in response to execution by a controller, cause the controller to perform operations is also disclosed herein. In accordance with various embodiments, the instruction includes receiving data, by the controller and from a guide sensor coupled to a mounting bracket, and commanding, by the controller, actuation of a movement mechanism coupled to the mounting bracket in response to data received from the guide sensor.

In various embodiments, the instructions include detecting movement of a passenger via the guide sensor, receiving data, by the controller and from the guide sensor, the data indicative of the movement of the passenger, commanding rotation of the light assembly along an x-axis via a first motor in response to the data received, and commanding rotation of the light assembly along a y-axis via a second motor in response to the data received such that the light assembly can rotate in both axis on an axis point.

In various embodiments, the instructions include detecting at least one of an ambient light and an ambient temperature via an ambient sensor, receiving data from the ambient sensor, and commanding adjustment of a light coupled to the mounting bracket in response to the data received from the ambient sensor.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Disclosed herein are systems and methods for an "eye-bot" reading light installed in an airplane suite. An "eye-bot" reading light is a light assembly with auto-directional functionality (e.g., responsive/adaptive movement). The "eye-bot" reading light is configured to move, imitating a human eye, based on the movement and/or position of the passenger in the suite. A guide sensor and an ambient sensor (e.g., an ambient light sensor) may be embedded in the reading light to facilitate such a function. For instance, the guide sensor will sense the location of the passenger and adjust the orientation of the reading light. Further, the ambient light sensor will sense the suite environment and adjust the intensity of light. In various configurations, the guide sensor and/or the ambient sensor may be positioned remote from the reading light and configured to communicate logically with the reading light.

Figure 1A:
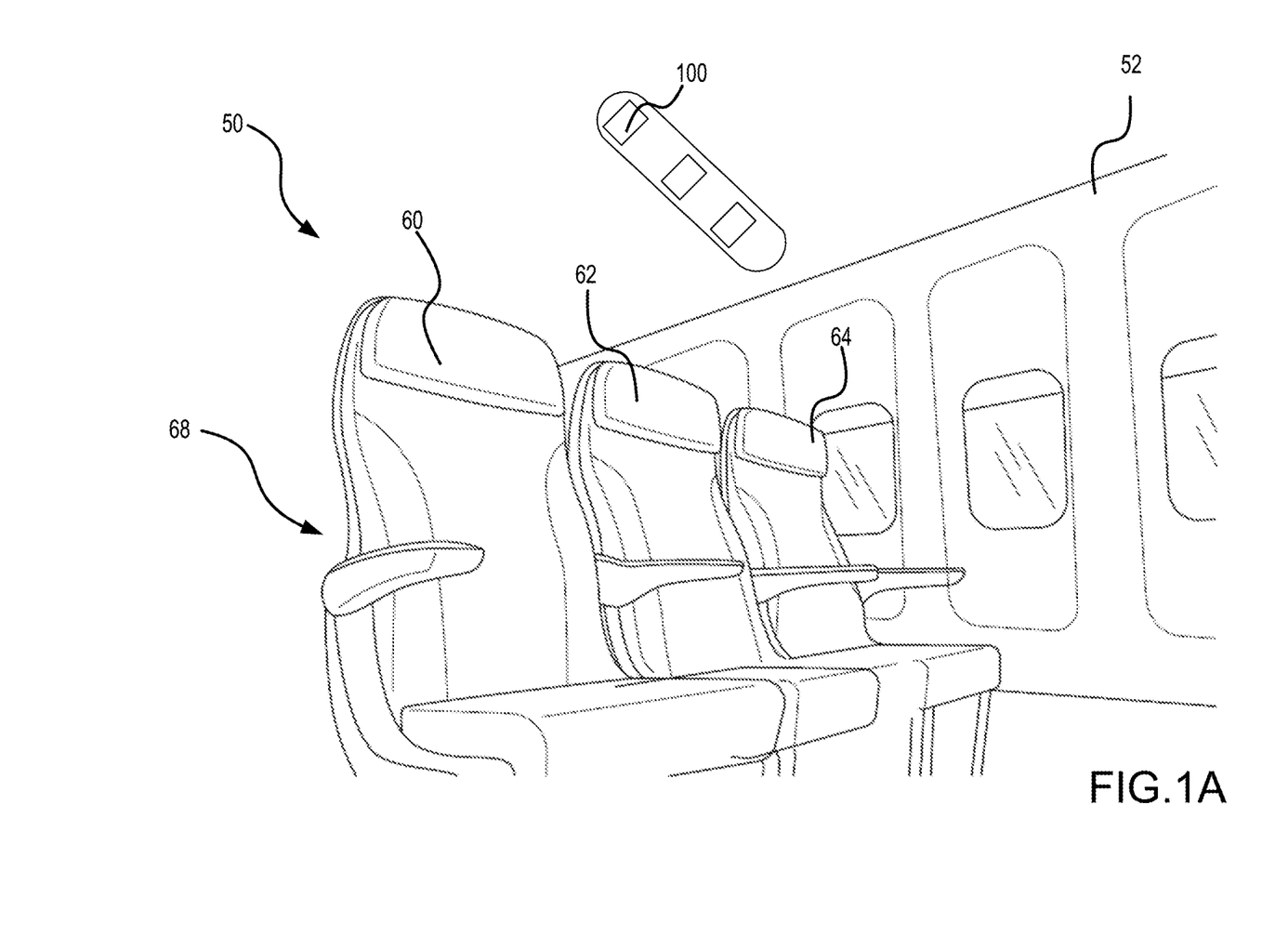
FIG. 1A illustrates a view of a cabin of an aircraft with a light assembly, in accordance with various embodiments.

With reference to FIG. 1A, a portion of a cabin 50 of an aircraft 52 is shown, according to various embodiments. The aircraft 52 may be any aircraft such as an airplane, a helicopter, or any other aircraft. The cabin 50 may include passenger seats such as first seat 60, second seat 62, and third seat 64. First seat 60, second seat 62, and third seat 64 may be located in a row 68 of cabin 50. Light systems, such as an eye-bot reading light assembly ("light assembly") 100, may be installed over and/or correspond to each passenger seat in a respective row in cabin 50. For example, the light assembly 100 is installed over first seat 60. In various embodiments, a plurality of light assemblies 100 may be installed such that a second light assembly is installed over second seat 62 and third a third light assembly is installed over third seat 64.

Figure 1B:
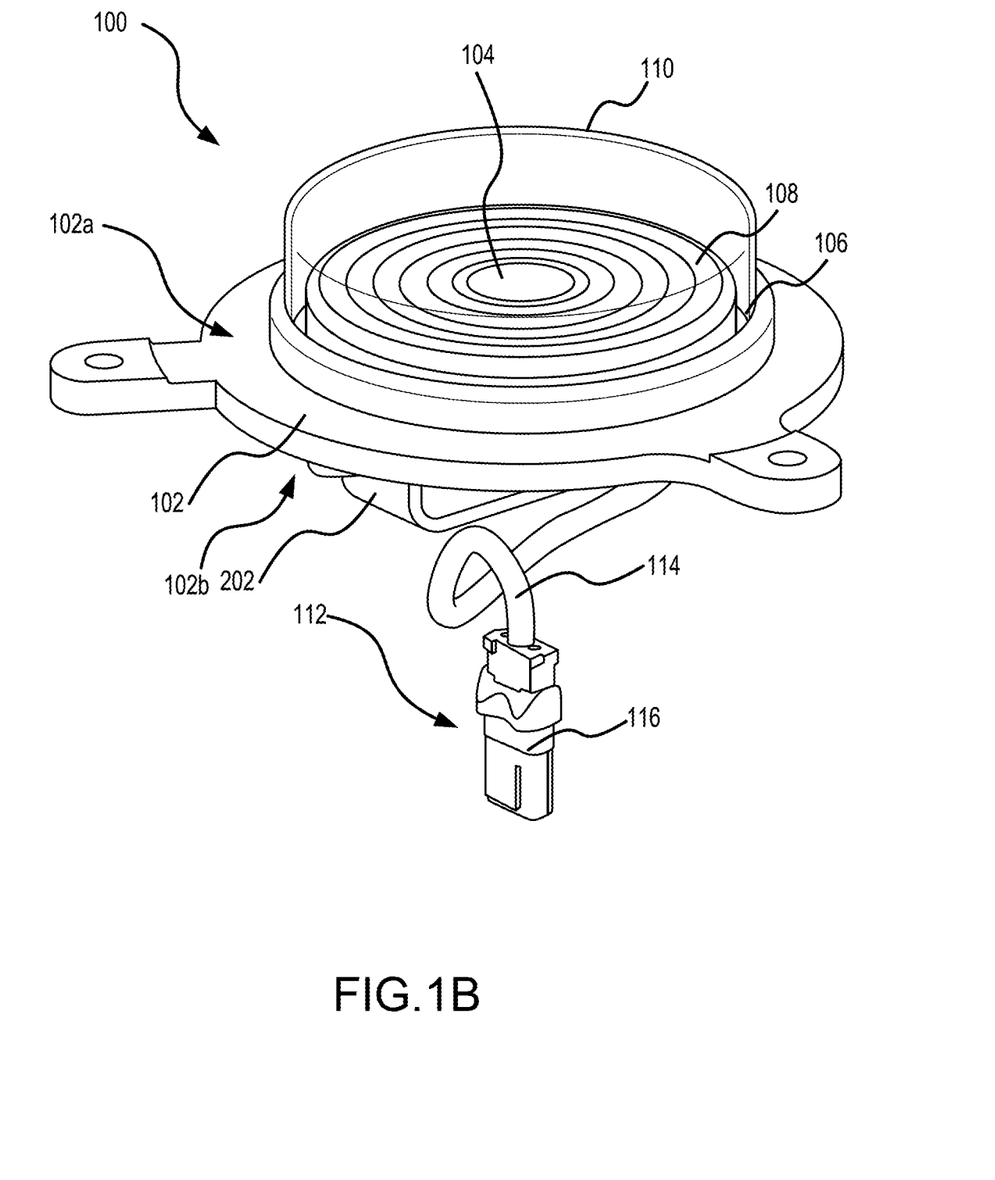
FIGS. 1B and 1C illustrate a light assembly, in accordance with various embodiments.
Figure 1C:
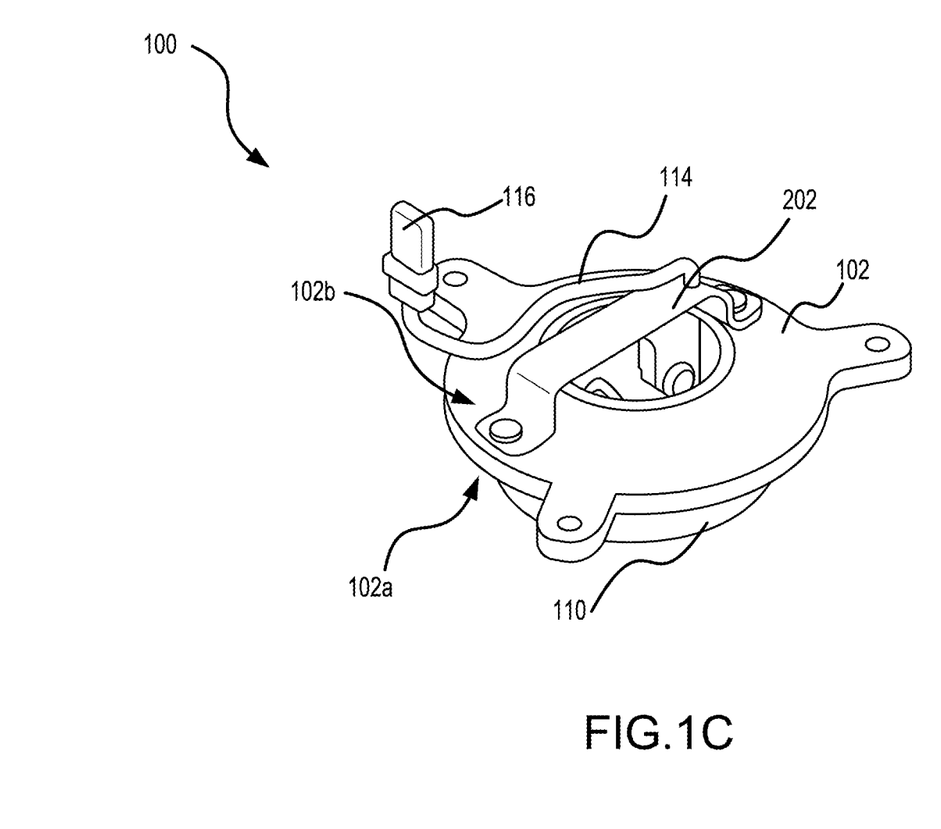

Referring now to FIGS. 1B and 1C, an eye-bot reading light assembly ("light assembly") 100 is illustrated. The light assembly 100 is configured to provide automatically adjusting reading lights for passengers. The light assembly 100 includes a mounting bracket 102. The mounting bracket 102 is configured to function as a base for the components of the light assembly 100. The mounting bracket 102 includes a first surface 102a and a second surface 102b opposite the first surface 102a. The light assembly 100 includes a guide sensor 104 (e.g., a tracker) coupled to the mounting bracket 102. For instance, the guide sensor 104 is coupled to the first surface 102a. The guide sensor 104 may be disposed in the center of the mounting bracket 102. The guide sensor 104 may be an infrared (IR) sensor, a light sensor, a UV sensor, a camera, etc. For instance, in various embodiments, the guide sensor 104 may be configured to detect movement of a passenger positioned within the detection radius of the guide sensor 104. In various embodiments, the guide sensor 104 may detect a heat signature from the passenger. In various embodiments, the guide sensor 104 may create and collect image data to be processed by a controller, explained further herein.

The light assembly 100 may further include an ambient sensor 106. The ambient sensor 106 may be coupled to the mounting bracket 102. For instance, the ambient sensor 106 is coupled to the first surface 102a. The ambient sensor 106 may be configured to detect the ambient light of the surrounding area (e.g., within the airplane suite). For instance, the ambient sensor 106 may detect the light intensity and/or the relative light intensity. As will be described herein, the guide sensor 104 and the ambient sensor 106 may be configured to transmit the various detections to a controller, such that the controller controls the light assembly to operate in response to the guide sensor 104 and/or the ambient sensor 106.

The light assembly 100 includes LED lights 108. The LED lights 108 may be coupled to the mounting bracket 102 such that the LED lights 108 surround the guide sensor 104 (e.g., the LED lights 108 are concentric with the guide sensor 104). For instance, the LED lights 108 are coupled to the first surface 102a. The LED lights 108 may be configured to be controlled by the controller such that the LED lights 108 are adjusted based on the ambient sensor 106. For instance, if the ambient sensor 106 detects that the ambient light has decreased (e.g., at night), the intensity of the LED lights 108 may be decreased.

The light assembly 100 includes a transparent cover 110. The transparent cover 110 is configured to couple to the mounting bracket 102. For instance, the transparent cover 110 is coupled to the first surface 102a. The transparent cover encloses the guide sensor 104, the ambient sensor 106, and/or the LED lights 108, thus protecting the various components from damage from external impact. In various embodiments, the ambient sensor 106 is disposed outside of the transparent cover 110.

The light assembly 100 further includes a plug 112. The plug 112 is configured to be coupled to the mounting bracket 102. For instance, the plug 112 is coupled to the second surface 112b. The plug 112 includes a pigtail 114 and a connector 116. The connector 116 is configured to be connected to a power source such that the pigtail 114 supplies power to the light assembly 100 (e.g., to power a movement mechanism, described herein). In various embodiments, the plug 112 is coupled to a first support bracket 202 (e.g., see also FIGS. 2A-2C) coupled to the second surface 112b of the mounting bracket 102.

Figure 2A:
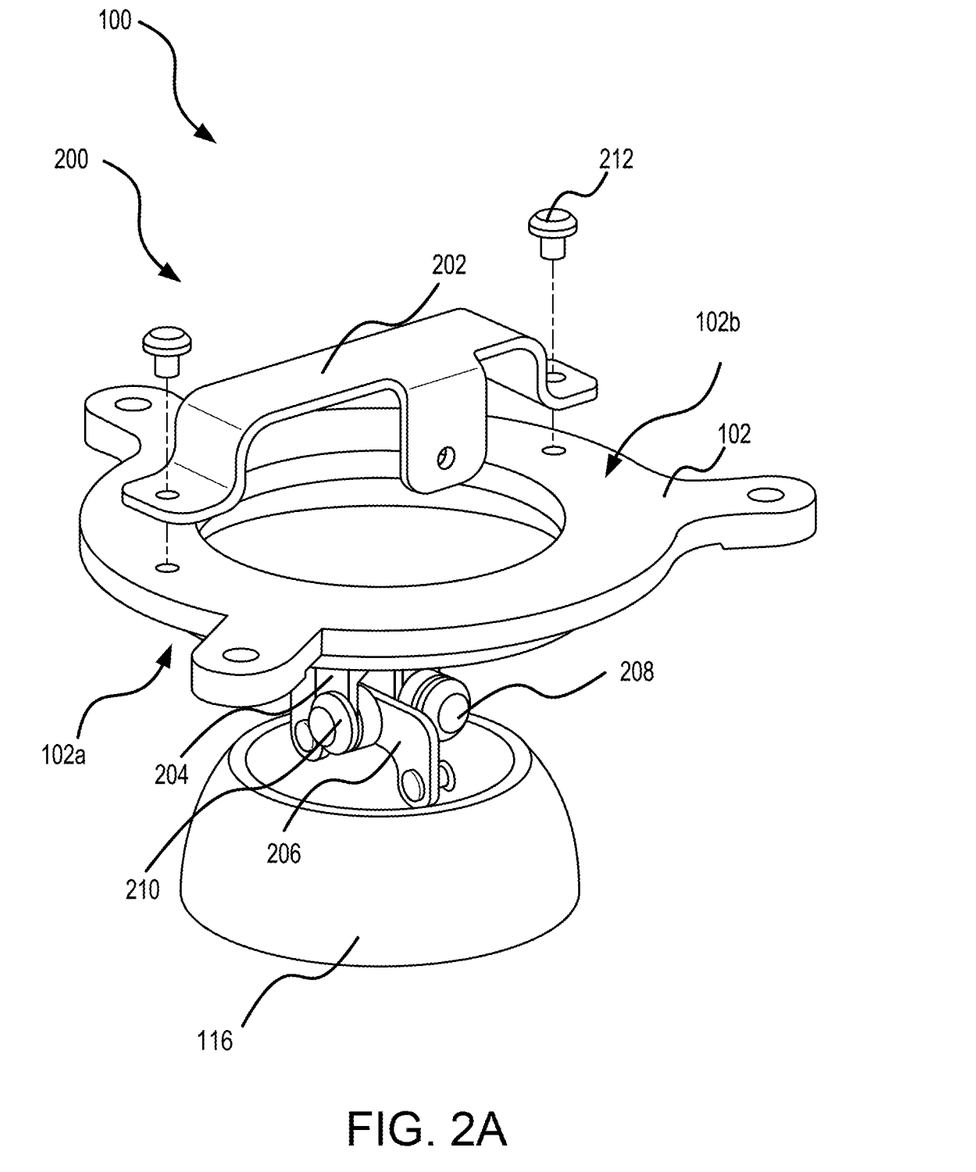
FIGS. 2A and 2B illustrate a movement mechanism of the light assembly of FIGS. 1A-1C, in accordance with various embodiments.
Figure 2B:
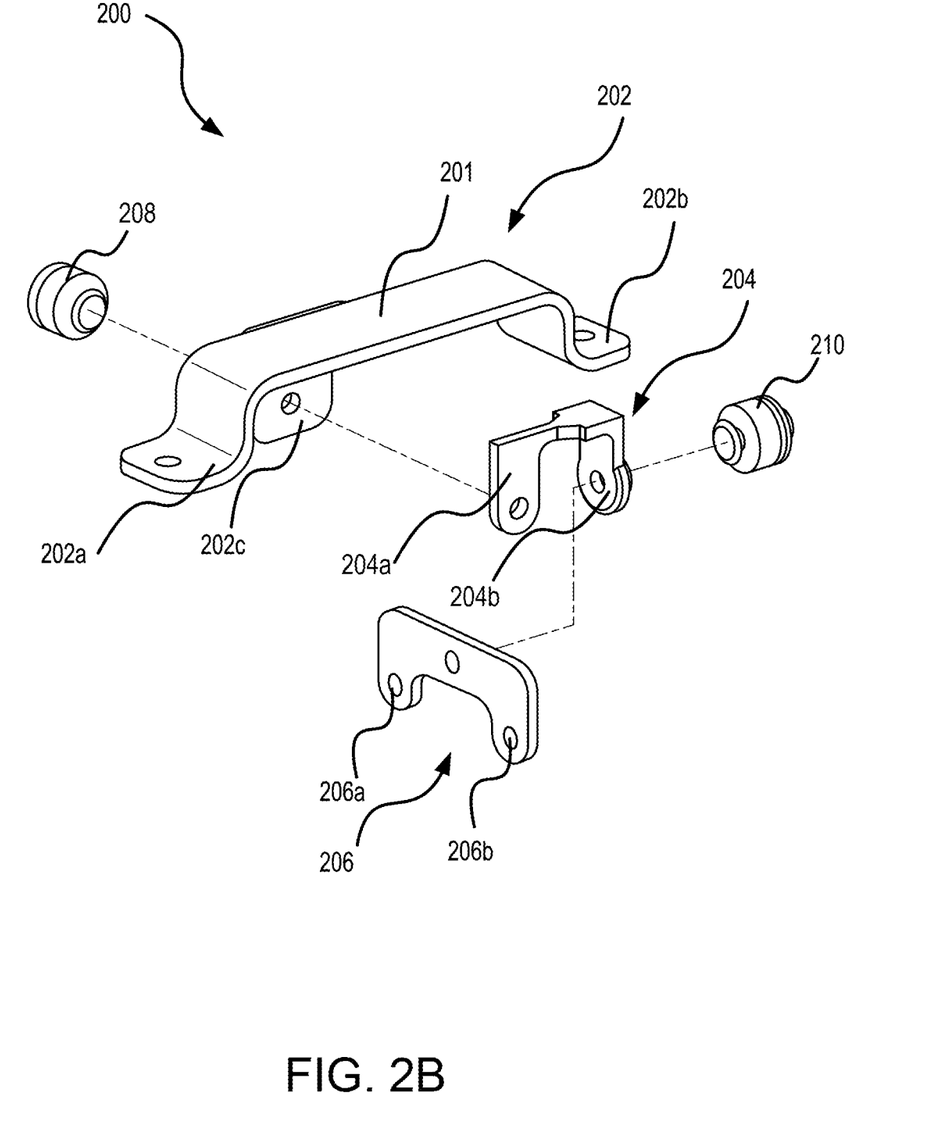
Figure 2C:
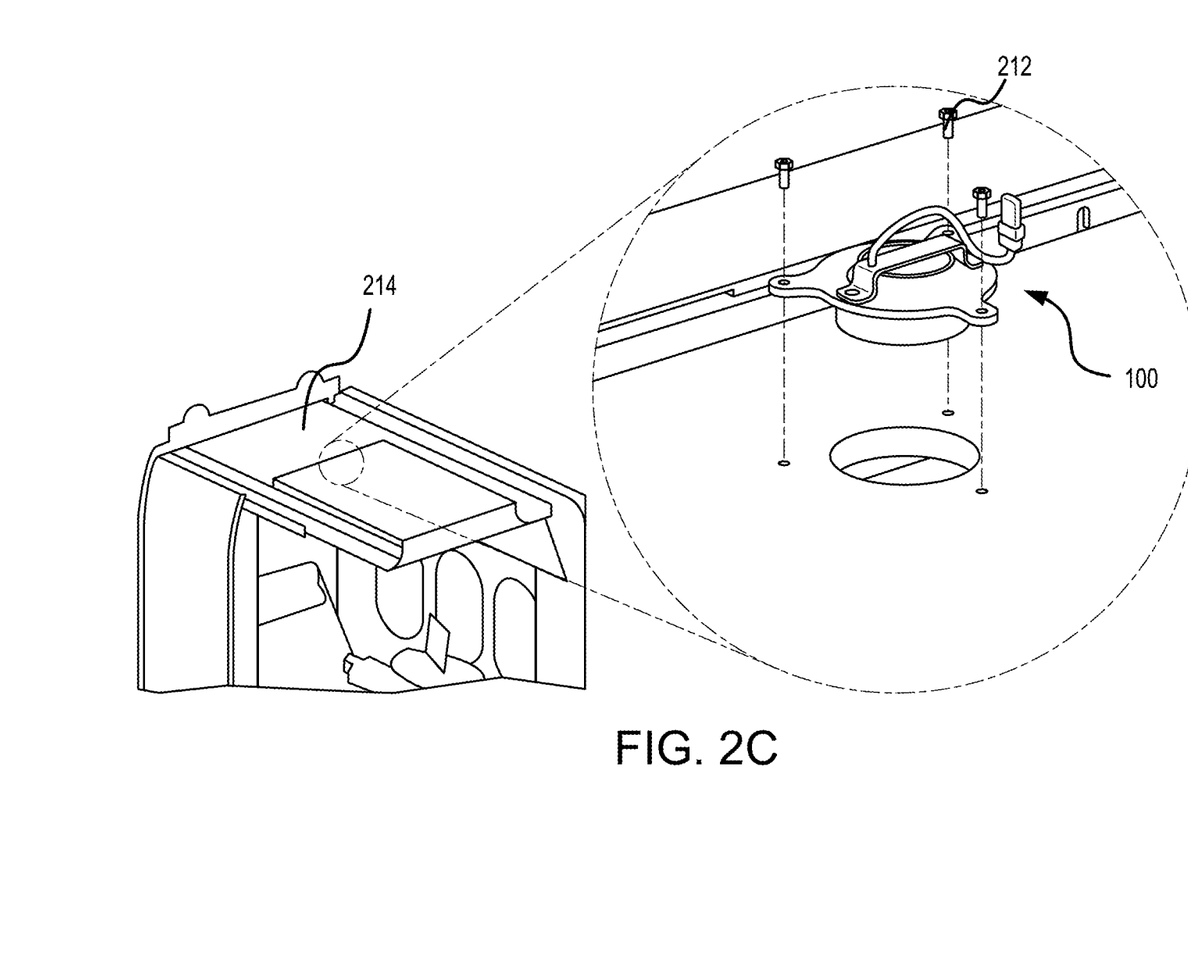
FIG. 2C illustrates the light assembly 100 as installed in an aircraft, in accordance with various embodiments.

Referring now to FIGS. 2A-2C, a movement mechanism 200 is illustrated. The movement mechanism 200 includes a plurality of support brackets coupled to the mounting bracket 102. For instance, the movement mechanism 200 includes a first support bracket 202, a second support bracket 204, and a third support bracket 206.

The first support bracket 202 includes a main body 201, a first flange 202a and a second flange 202b opposite the first flange 202a. The first flange 202a and the second flange 202b extend from opposite ends of the main body 201. The first support bracket 202 (e.g., the main body 201) extends across the mounting bracket 102 and is configured to be coupled to the mounting bracket 102. For instance, the first flange 202a and the second flange 202b are configured to couple to the second surface 102b such that the first support bracket 202 is distanced from the mounting bracket 102. The first support bracket 202 may include a third flange 202c. For instance, the third flange 202c may extend from the center of the main body 201.

The second support bracket 204 includes a first surface 204a and a second surface 204b. The first surface 204a extends along a first plane and the second surface 204b extends along a second plane perpendicular to the first plane. The second support bracket 204 is configured to couple to the first support bracket 202. For instance, the second support bracket 204 may be coupled to the first support bracket 202 such that the first surface 204a is in confronting relation with the third flange 202c of the first support bracket 202.

The third support bracket 206 includes a first foot 206a and a second foot 206b. The first foot 206a and the second foot 206b extend from a same edge of the third support bracket 206 and along a same plane. The third support bracket 206 is configured to couple to the second support bracket 204. For instance, the third support bracket 206 may be coupled to the second support bracket 204 such that the second surface 204b is centered between the first foot 206a and the second foot 206b.

The movement mechanism 200 further includes a first motor 208 and a second motor 210. The first motor 208 is configured to couple to the first support bracket 202 and the second support bracket 204. Accordingly, the first motor is configured to tilt the light assembly 100 along an x-axis. The second motor is configured to couple to the second support bracket 204 and the third support bracket 206. Accordingly, the second motor 210 is configured to tilt the light assembly 100 along a y-axis. The light assembly 100 is thus configured to rotate all around on its own axis point and can be adjusted to customized/personal preferences.

Referring specifically to FIG. 2C, the light assembly 100, including the movement mechanism 200, are illustrated as installed in an aircraft. For instance, a plurality of fasteners 212 (e.g., bolts, quarter turns or any other suitable alternative fasteners) are included to fasten the mounting bracket 102 to a ceiling panel 214 of the aircraft. In various embodiments, the light assembly 100 may be installed on a side panel of the aircraft suite. In various embodiments, the light assembly 100 may be installed on a forward panel and/or an aft panel of the aircraft suite. In various embodiments, the light assembly 100 may be mounted to a light cone 116. For instance, the light cone 116 may house a controller and/or the LED lights 108.

Figure 3A:
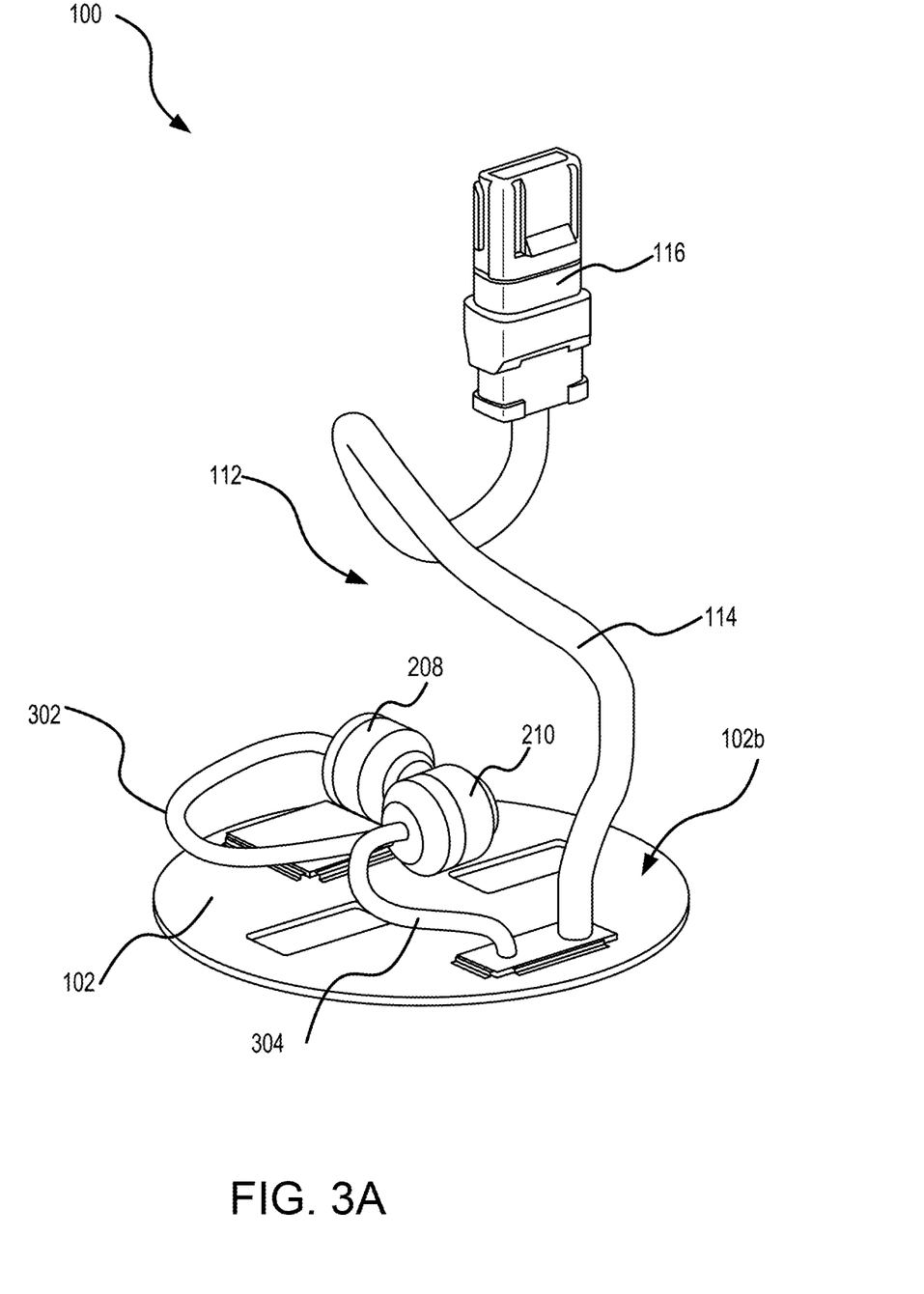
FIGS. 3A and 3B illustrate a controller of the light assembly, in accordance with various embodiments.
Figure 3B:
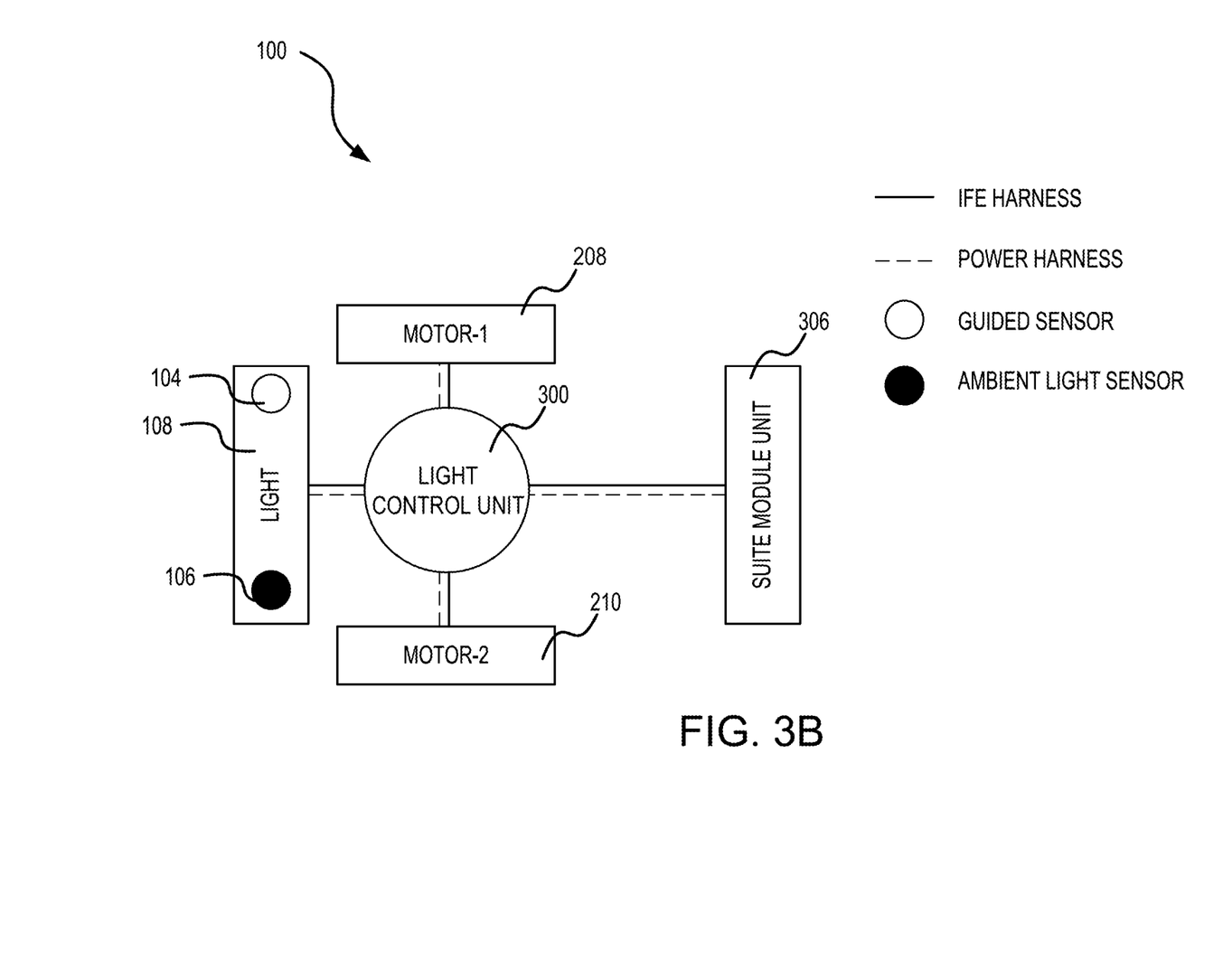

Referring now to FIGS. 3A and 3B, the light assembly 100 includes a light controller 300. Light controller 300 is operably coupled to the light assembly 100, including the movement mechanism 200. Light controller 300 is configured to receive and interpret detection signals output from the guide sensor 104 and the ambient sensor 106. Light controller 300 is further configured send light commands to the LED lights 108 and the first and second motors 208, 210 based on the detection signal received from the guide sensor 104 and the ambient sensor 106.

Light controller 300 may include one or more logic devices such as one or more of a central processing unit (CPU), an accelerated processing unit (APU), a digital signal processor (DSP), a field programmable gate array (FPGA), an application specific integrated circuit (ASIC), or the like (e.g., light controller 300 may utilize one or more processors of any appropriate type/configuration, may utilize any appropriate processing architecture, or both). In various embodiments, light controller 300 is in communication with, and may include, any non-transitory memory known in the art. The memory may store instructions usable by the logic device(s) of light controller 300 to perform operations related to controlling the light assembly 100. Any appropriate computer-readable type/configuration may be utilized as the memory, any appropriate data storage architecture may be utilized by the memory, or both.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Referring still to FIGS. 3A and 3B, the light assembly 100 includes a first actuation harness 302 and a second actuation harness 304. The first actuation harness 302 is configured to operatively couple the first motor 208 and the second motor 210. The second actuation harness 304 is configured to operatively couple the first motor 208 and the light controller 300. Accordingly, the first actuation harness 302 and the second actuation harness 304 facilitate communication between the light controller 300 and the first and second motors 208, 210.

Figure 4A:
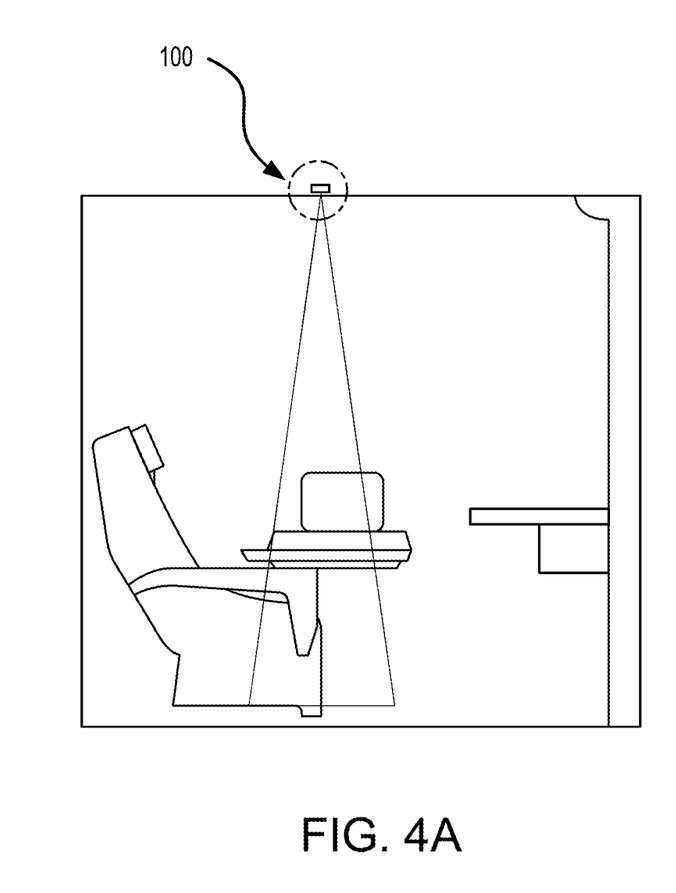
FIGS. 4A and 4B illustrate a functionality of the light assembly, in accordance with various embodiments.

The light assembly 100 is calibrated with the other surfaces in the aircraft suite (e.g., see FIG. 4A). The data is then stored in the memory. Once the passenger enters the suite, movement may be detected based on the interference with the distance between the guide sensor 104 and the previously registered surfaces. For instance, the movement may be detected via image data. The image data is then processed with AI to recognize a human/passenger and contextualize the human in the seat/cabin to create spatial relationship data. The guide sensor 104 may continuously be collecting the image data such that the AI processes a change in the spatial data, thus concluding/detecting movement. In various embodiments, the guide sensor 104 may be an infrared (IR) sensor, a light sensor, a UV sensor, a camera, etc. For instance, in various embodiments, the guide sensor 104 may detect heat radiating from the passenger (e.g., the guide sensor is an IR sensor). The heat signature detected via the guide sensor 104 corresponds with the movement of the passenger.

Figure 4B:
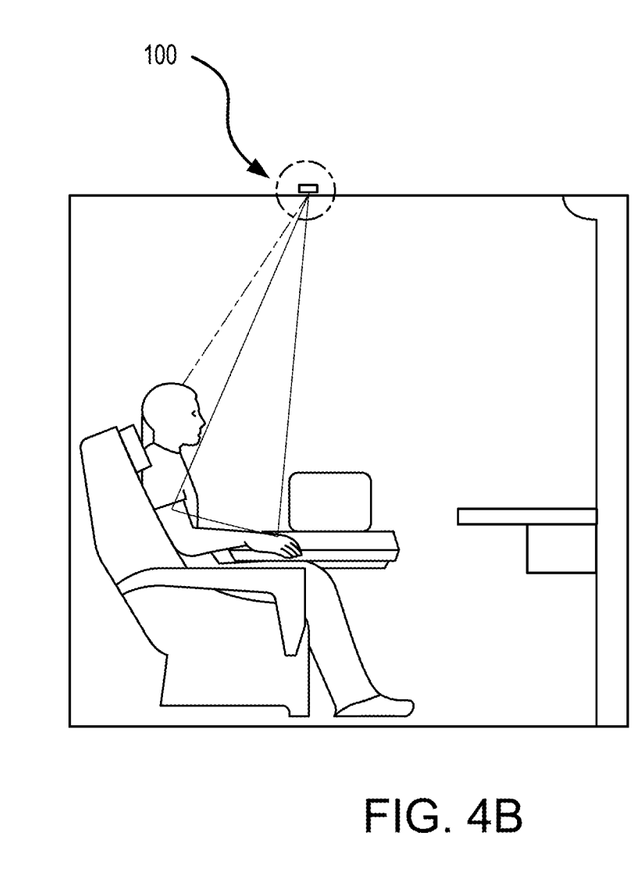

Once the movement is detected, the light assembly 100 may automatically adjust in response to the movement (e.g., spatial data). For instance, the guide sensor 104 transmits the movement data to a suite circuit 306 via the controller. The suite circuit 306 in turn triggers actuation of the first motor 208 and/or the second motor 210 via the light controller 300. By tilting on either or both the x-axis and the y-axis, the light can adapt to the user and continue to focus the light on the passenger's workspace, for instance (e.g., see FIG. 4B).

Similarly, the ambient sensor 106 may detect a change in the ambient lighting and adjust the LED light 108 accordingly. For instance, if the ambient sensor 106 detects the aircraft suite/cabin is brighter (e.g., after the sunrise), the ambient sensor 106 transmits the light data to the suite circuit 306 via the light controller 300. The suite circuit 306 in turn adjusts the LED light 108 to dim. Additionally, the ambient sensor 106 may detect that the main cabin lights as controlled by the crew has been turned off or on. As such the light controller 300 may instruct the LED lights 108 to output a greater intensity or a less intensity, respectively. In various embodiments, the ambient sensor 106 may be an IR sensor. Accordingly, the ambient sensor 106 may detect heat (e.g., when food is served), and trigger the LED light 108 to brighten. For instance, if heat is detected, the signal from the ambient sensor 106 is transmitted by the light controller 300 and processed by the suite circuit 306 to determine that an activity is occurring wherein more light is needed (e.g., so the passenger can see what they are doing). Accordingly, based on that determination, a signal is sent via the light controller 300 to the LED lights 108 to increase the intensity (e.g., cause a brighter illumination).

In various embodiments, the passenger can additionally control, or adjust, the light assembly 100 manually. In various embodiments, the passenger can additionally control, or adjust, the light assembly 100 via a tablet, a remote, or other user interface. In various embodiments, the LED light 108 may be changed to a color (e.g., a mood lighting based on the sensed lighting). In various embodiments, the passenger can switch the light assembly 100 to certain preset settings (e.g., "bed light," "dine light," and/or "reading light").

Figure 5:
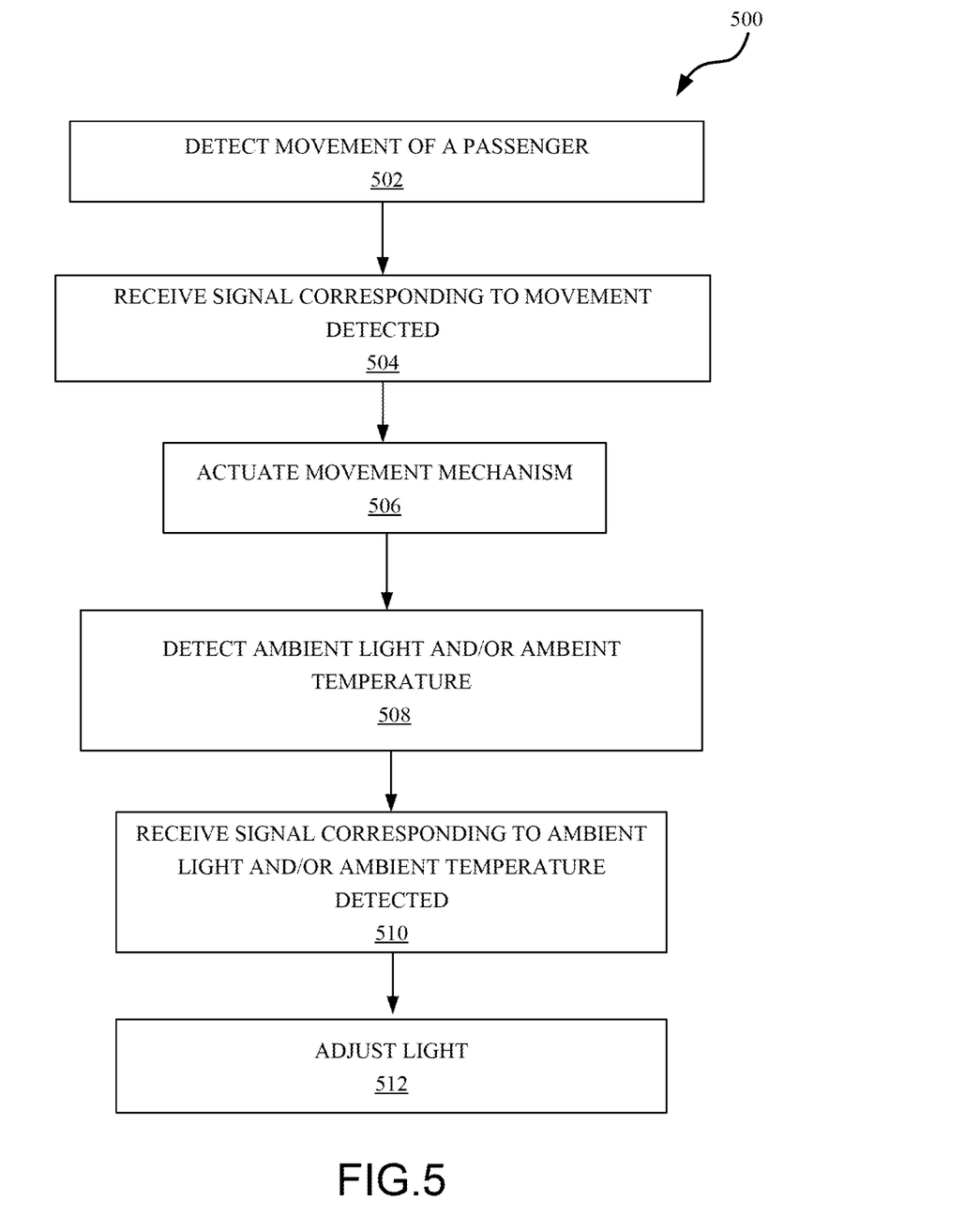
FIG. 5 illustrates a method for controlling the light assembly, in accordance with various embodiments.

With reference to FIG. 5, a method 500 for controlling the light assembly 100 described above, is illustrated. In accordance with various embodiments, method 500 may include, at 502, detecting movement of a passenger via the guide sensor coupled to a mounting bracket. At 504, the method may include receiving data from the guide sensor. For instance, the data may be indicative of the movement of the passenger. At 506, the method 500 may include actuating a movement mechanism coupled to the mounting bracket in response to data received from the guide sensor. For instance, actuating the movement mechanism may include rotating the light assembly along an x-axis via a first motor in response to the data received. Additionally, actuating the movement mechanism may include rotating the light assembly along a y-axis via a second motor in response to the data received such that the light assembly can rotate in both axis on an axis point. In various embodiments, the method 500 may include detecting at least one of an ambient light and an ambient temperature via an ambient sensor at 508. Thus, at 510, the method 500 includes receiving data from the ambient sensor, and at 512, adjusting a light coupled to the mounting bracket in response to the data received from the ambient sensor. For instance, if the ambient sensor detects a bright ambient light, the intensity of the LED lights may be reduced.

As described herein, an eye-bot reading light is provided to provide automatically adjusting reading lights for passengers in luxury classes. Additionally, the same light can be used as a reading light, dining light, bed light, etc. to avoid multiple lights installation in the suites. The structure is configured to fit in all retro fit programs of various levels of luxury classes, and utilization of the AI in the suites will improve the feel and attraction to the luxury classes. Beneficially, the eye-bot reading like is easy to operate and is associated with less effort for the passenger and/or crew.

The system and methods described herein may be described in terms of functional block components, optional selections, and various processing steps. It should be appreciated that such functional blocks may be realized by any number of hardware or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, VBScript, COBOL, MICROSOFT® Active Server Pages, assembly, PERL®, PHP, PYTHON®, Visual Basic, SQL Stored Procedures, PL/SQL, any UNIX® shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like.

Benefits, other advantages, and solutions to problems have been described herein with regard to specific embodiments. Furthermore, the connecting lines shown in the various figures contained herein are intended to represent exemplary functional relationships or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A light assembly comprising:
   a mounting bracket;
   a light coupled to the mounting bracket;
   a guide sensor coupled to the mounting bracket;
   a movement mechanism coupled to the mounting bracket, wherein the movement mechanism comprises:
      a first support bracket having a first flange, a second flange opposite the first flange, and a third flange, the first and second flanges configured to be coupled to the mounting bracket;
      a second support bracket having a first surface extending along a first plane and a second surface extending along a second plane perpendicular to the first plane, the first surface configured to be coupled to the third flange of the first support bracket; and
      a third support bracket having a first foot and a second foot, the first foot and the second foot both extending from a same edge of the third support bracket and along a same plane, the second surface of the second support bracket configured to be coupled to an area between the first foot and the second foot; and
   a controller operably coupled to the light assembly, the controller configured to:
      receive data from the guide sensor; and
      command actuation of the movement mechanism in response to the data received from the guide sensor.

2. The light assembly of claim 1, wherein the movement mechanism further comprises:
   a first motor coupled to the third flange of the first support bracket and the first surface of the second support bracket; and
   a second motor coupled to second surface of the second support bracket and the area between the first foot and the second foot of the third support bracket.

3. The light assembly of claim 2, wherein the first motor is configured to rotate the light assembly along an x-axis and the second motor is configured to rotate the light assembly along a y-axis such that the light assembly can rotate in both axes on an axis point.

4. The light assembly of claim 1, wherein the guide sensor is configured to detect movement of a passenger.

5. The light assembly of claim 4, wherein the data received by the controller from the guide sensor is the movement of the passenger.

6. The light assembly of claim 1, further comprising an ambient sensor.

7. The light assembly of claim 6, wherein the ambient sensor is configured to detect at least one of an ambient light or an ambient temperature.

8. The light assembly of claim 7, wherein the controller is further configured to:
   receive data from the ambient sensor; and
   adjust the light in response to the data received from the ambient sensor.

9. A method of operating a light assembly, the method comprising:
   receiving data from a guide sensor coupled to a mounting bracket to a controller;
   interpreting, by the controller, the data from the guide sensor; and
   automatically actuating, by the controller, a movement mechanism coupled to the mounting bracket in response to data received from the guide sensor, wherein the movement mechanism comprises:
      a first support bracket having a first flange, a second flange opposite the first flange, and a third flange, the first and second flanges configured to be coupled to the mounting bracket;

a second support bracket having a first surface extending along a first plane and a second surface extending along a second plane perpendicular to the first plane, the first surface configured to be coupled to the third flange of the first support bracket; and a third support bracket having a first foot and a second foot, the first foot and the second foot both extending from a same edge of the third support bracket and along a same plane, the second surface of the second support bracket configured to be coupled to an area between the first foot and the second foot.

10. The method of claim 9, wherein the movement mechanism further comprises:

a first motor coupled to the first support bracket and the second support bracket; and a second motor coupled to the second support bracket and the third support bracket.

11. The method of claim 10, further comprising:

rotating the light assembly along an x-axis via the first motor; and rotating the light assembly along a y-axis via the second motor such that the light assembly can rotate in both axes on an axis point.

12. The method of claim 9, further comprising detecting movement of a passenger via the guide sensor.

13. The method of claim 12, further comprising receiving data from the guide sensor comprises data indicative of the movement of the passenger.

14. The method of claim 9, further comprising detecting at least one of an ambient light or an ambient temperature via an ambient sensor.

15. The method of claim 14, further comprising:

receiving data from the ambient sensor; and adjusting a light coupled to the mounting bracket in response to the data received from the ambient sensor.

16. An article of manufacture including a tangible, non-transitory computer-readable storage medium having instructions stored thereon for controlling a light assembly that, in response to execution by a controller, cause the controller to perform operations comprising:

receiving, by the controller and from a guide sensor, data from a guide sensor coupled to a mounting bracket;

interpreting, by the controller, the data from the guide sensor; and commanding, by the controller, actuation of a movement mechanism coupled to the mounting bracket in response to data received from the guide sensor, wherein the movement mechanism comprises:

a first support bracket having a first flange, a second flange opposite the first flange, and a third flange, the first and second flanges configured to be coupled to the mounting bracket;

a second support bracket having a first surface extending along a first plane and a second surface extending along a second plane perpendicular to the first plane, the first surface configured to be coupled to the third flange of the first support bracket; and a third support bracket having a first foot and a second foot, the first foot and the second foot both extending from a same edge of the third support bracket and along a same plane, the second surface of the second support bracket configured to be coupled to an area between the first foot and the second foot.

17. The article of manufacture of claim 16, wherein the operations further comprise:

detecting movement of a passenger via the guide sensor;

receiving data, by the controller and from the guide sensor, the data indicative of the movement of the passenger;

commanding rotation of the light assembly along an x-axis via a first motor in response to the data received; and commanding rotation of the light assembly along a y-axis via a second motor in response to the data received such that the light assembly can rotate in both axes on an axis point.

18. The article of manufacture of claim 16, wherein the operations further comprise:

detecting at least one of an ambient light or an ambient temperature via an ambient sensor;

receiving data from the ambient sensor; and commanding adjustment of a light coupled to the mounting bracket in response to the data received from the ambient sensor.

* * * * *